United States Patent
Kern

[11] Patent Number: 5,859,507
[45] Date of Patent: Jan. 12, 1999

[54] CIRCUIT ARRANGEMENT FOR STARTING AND OPERATING A HIGH-PRESSURE GAS DISCHARGE LAMP OPERATING BY CONTROLLED ALTERNATING CURRENT

[75] Inventor: Robert Kern, Sasbachwalden, Germany

[73] Assignee: Robert Bosch GmbH, Stuttgart, Germany

[21] Appl. No.: 836,741

[22] PCT Filed: Apr. 16, 1996

[86] PCT No.: PCT/DE96/00656

§ 371 Date: May 15, 1997

§ 102(e) Date: May 15, 1997

[87] PCT Pub. No.: WO97/11584

PCT Pub. Date: Mar. 27, 1997

[30] Foreign Application Priority Data

Sep. 20, 1995 [DE] Germany .................. 195 34 861.3

[51] Int. Cl.$^6$ .................................................. H05B 37/02
[52] U.S. Cl. .................... 315/309; 315/82; 315/94
[58] Field of Search .................. 315/82, 291, 307, 315/308, 224, 94, 244, 309

[56] References Cited

U.S. PATENT DOCUMENTS

| | | | |
|---|---|---|---|
| 5,055,742 | 10/1991 | Jurrel | 315/94 |
| 5,233,273 | 8/1993 | Waki et al. | 315/224 |
| 5,469,027 | 11/1995 | Uchihashi et al. | 312/224 |

*Primary Examiner*—Don Wong
*Assistant Examiner*—David H. Vu
*Attorney, Agent, or Firm*—Venable; George H. Spencer; Norman N. Kunitz

[57] ABSTRACT

A direct voltage source (1) delivers a voltage ($U_B$) at its output terminals, which is then converted by a direct voltage/direct voltage converter (2) to a higher value. This higher voltage value ($U_D$) constitutes the input voltage for a controlled full bridge circuit (3), which generates a controlled alternating current ($I_L$) or an alternating voltage ($U_L$) from the supplied input voltage. This alternating voltage is present at the output terminals (4, 5) and constitutes the supply voltage for a high-pressure gas discharge lamp. A control circuit (7), which supplies its control pulses via a line (8) is provided to control the full bridge circuit. In addition, an ignition circuit (9) is provided, which supplies the ignition voltage via the line (10) to the high-pressure gas discharge lamp (6). In accordance with the invention, the full bridge circuit (3) is controlled by the control circuit (7) in such a way that the duration of the half-wave phases of the lamp voltage ($U_L$) or the lamp current ($I_L$) is variable. In this case, the variability is selected in dependence on the respective temperature of the electrodes (11, 12) of the high-pressure gas discharge lamp.

8 Claims, 2 Drawing Sheets

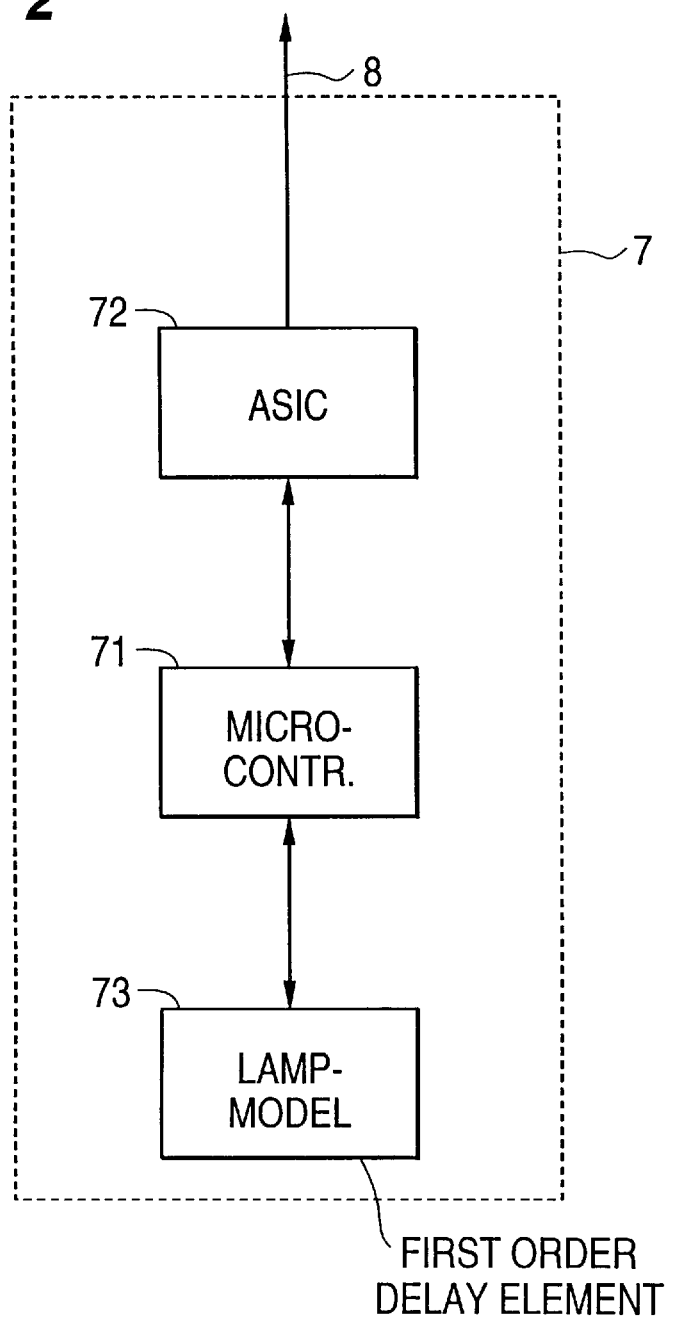

CIRCUIT ARRANGEMENT FOR STARTING AND OPERATING A HIGH-PRESSURE GAS DISCHARGE LAMP OPERATING BY CONTROLLED ALTERNATING CURRENT

PRIOR ART

The invention relates to a circuit arrangement for starting and operating a high-pressure gas discharge lamp operating by controlled alternating current, in particular for use in motor vehicle headlamps, of the type wherein the voltage ($U_B$) of a direct voltage source is converted to a higher value by means of a direct current/direct current converter, and a controlled alternating current ($I_L$) for supplying the high-pressure gas discharge lamp is generated from this current ($U_B$) by a controlled full-bridge circuit that can be operated either with direct or alternating current, and for which a control circuit for actuating the full bridge circuit, as well as an ignition device for igniting the high-pressure gas discharge lamp are provided.

A series reactor for starting and operating alternating current high-pressure gas discharge lamps is known from German patent application DE 41 36 486 A1, wherein the reactor is supplied from a direct voltage source, e.g. the battery of a motor vehicle. A stabilized and/or power-controlled direct voltage with a higher voltage value is initially generated from the direct voltage of the direct voltage source by means of a DC/DC converter. The alternating current necessary for the operation is then generated from this higher voltage with the aid of a controlled full bridge circuit. The full bridge circuit can be operated either with direct current or also with alternating current. The full bridge circuit is controlled by a control circuit, and an ignition device is provided for igniting the high-pressure gas discharge lamp.

With this known series reactor, the bridge circuit is operated with direct current during the start-up to achieve a rapid and reliable ignition as well as to reach rapidly and reliably a stable operating state without flickering of the lamp. A signal is generated via a status determination device, provided the high-pressure gas discharge lamp has been ignited successfully. This signal is transmitted via a delay circuit to the control circuit for the full bridge circuit and ensures that the full bridge circuit is switched only after the predetermined delay time from the direct current operation to the alternating current operation.

The problem with high-pressure gas discharge lamps operating by alternating current, in particular cold lamps, generally is that the high-pressure gas discharge lamp goes out during the pole reversal process and that it must be ignited again following the pole reversal. The voltage required for a re-ignition determines the necessary open-circuit voltage of the supply circuit, meaning in this case the voltage present at the output of the full bridge circuit.

SUMMARY AND ADVANTAGES OF THE INVENTION

The problems according the prior art arrangements as discussed above are essentially overcome according to the present invention in that in a circuit arrangement of the type initially described above, the control circuit controls the full bridge circuit such that the duration of the half-wave phases of the alternating current ($I_L$) that supplies the high-pressure gas discharge lamp is variable and is varied in dependence on the respective temperature of the electrodes of the high-pressure gas discharge lamp.

In contrast to the prior known circuit arrangement, the inventive circuit arrangement for starting and operating a high-pressure gas discharge lamp operating by controlled alternating current, with the features mentioned above, has the advantage that it keeps the open-circuit voltage of the supply circuit low. As a result of this, the cost-effectiveness ratio of the total circuit arrangement becomes more favorable.

In accordance with the invention, this is achieved principally through an adaptive adjustment of the half-wave times of the alternating circuit or voltage supplied to the gas discharge lamp to the instantaneous temperature of the electrodes for the high-pressure gas discharge lamp. Typically, it is provided in this case that the control circuit controls the full bridge circuit in such a way that the duration of the half-wave phases of the alternating current that supplies the high-pressure gas discharge lamp is variable and that this variability is selected depending on the respective temperature of the electrodes in the high-pressure gas discharge lamp.

Advantageous modifications and improvements of the circuit arrangement specified described above are possible and are discussed and described below.

According to a particularly advantageous embodiment of the invention, the duration of the half-wave phases is variable during the start-up as well as during the operation of the high-pressure gas discharge lamp.

For an advantageous and particularly useful embodiment of the invention, a model of the high-pressure gas discharge lamp is reproduced in the control circuit for determining the temperature of the electrodes of the high-pressure gas discharge lamp. In a suitable way, a delay element of the first order is provided for reproducing an approximate model of the high-pressure gas discharge lamp.

In another advantageous embodiment of the invention, the control circuit adjusts the length of the half-waves with the aid of a function that depends on the determined instantaneous temperature of the electrodes for the high-pressure gas discharge lamp as well as on the lamp current. The function in this case is advantageously selected such that the temperature of the electrodes for the high-pressure gas discharge lamp is always constant just prior to the pole reversal.

In an advantageous modification of the invention, the control circuit contains a microcontroller, which generates the necessary control pulses. In addition, it is useful to provide that an ASIC (Application Specific Integrated Circuit) be connected to the microcontroller to make the application-specific adaptation to the respective control section available.

BRIEF DESCRIPTION OF THE DRAWINGS

The invention is explained below in more detail with the aid of an embodiment shown in the drawing wherein:

FIG. 2 is a block circuit diagram of one embodiment of the controller of FIG. 1.

DETAILED DESCRIPTION OF THE PREFERRED EMBODIMENT

Figure 1:
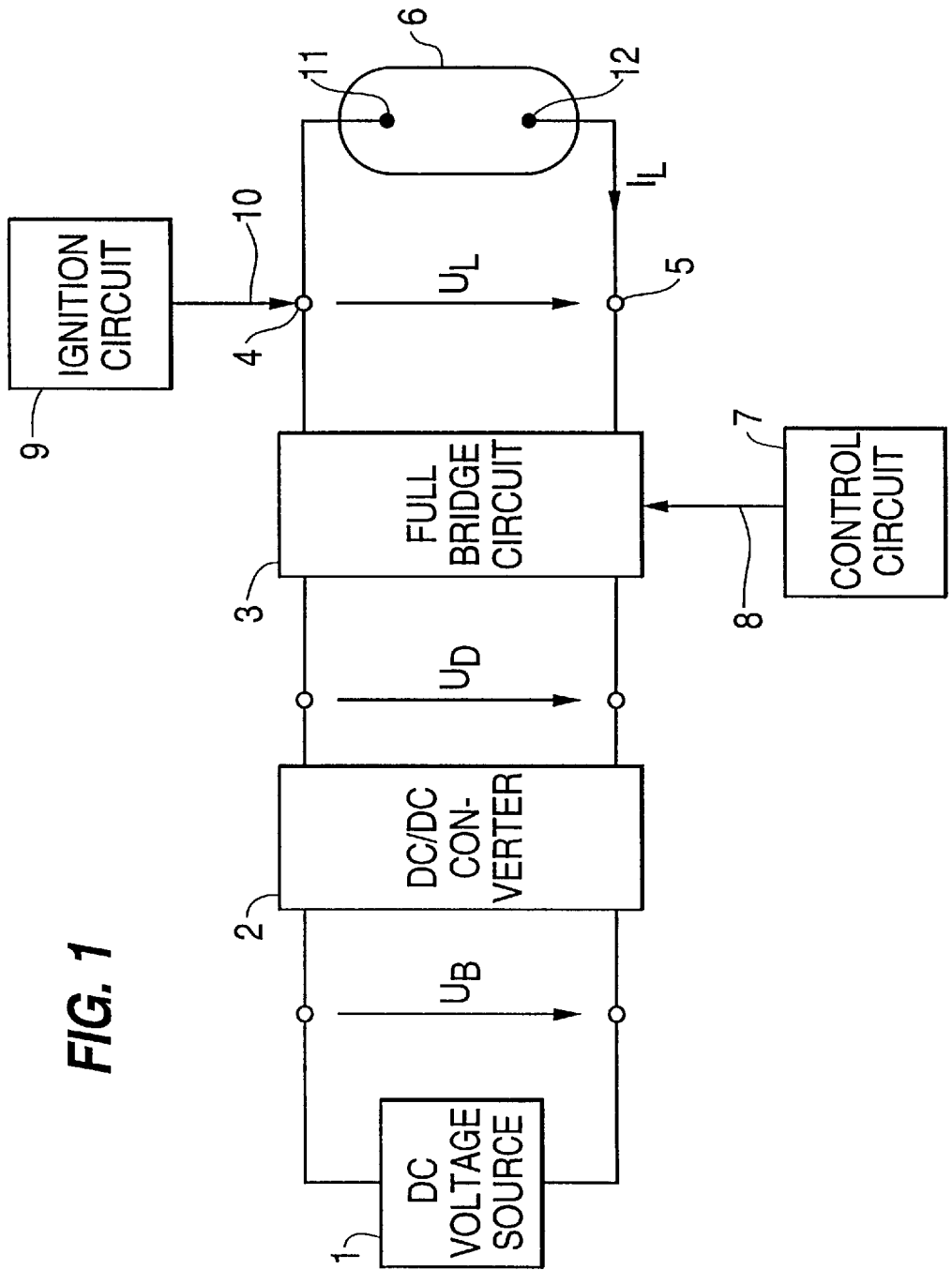
FIG. 1 is a block circuit diagram in which the inventive circuit arrangement is embodied.

A circuit arrangement embodying the invention is shown in FIG. 1 with the aid of a block circuit diagram. The number 1 is assigned to a direct voltage source, which can be the battery of a motor vehicle. It delivers the voltage $U_B$ at its output terminals. This voltage $U_B$ is increased to a higher value or is converted by a direct voltage/direct voltage converter 2 (DC/DC converter). This higher voltage value $U_D$ is present at the output terminals of the DC/DC converter 2. It constitutes the input voltage for a controlled full bridge circuit 3, which generates a controlled alternating current or an alternating voltage from it. This alternating voltage is present at the output terminals 4 and 5 and constitutes the supply voltage $U_L$ for a high-pressure gas discharge lamp 6. In order to control the full bridge circuit 3, a control circuit 7 is provided, which supplies its control pulses via the lines 8 that are indicated by the arrow. Furthermore, an ignition circuit 9 is provided, which supplies the ignition voltage to the high-pressure gas discharge lamp 6 by way of line 10, symbolized with an arrow, and via the terminal 4.

In accordance with the invention, the full bridge circuit 3 is controlled by the control circuit 7 in such a way that the duration of the half-wave phases of the lamp voltage $U_L$ or the lamp current $I_L$ is variable. The variability in this case is selected in dependence on the respective temperature of the electrodes 11 and 12 for the high-pressure gas discharge lamp 6. The duration of the half-wave phases is advantageously configured to be variable during the start-up, meaning the ignition process, as well as during the operation of the high-pressure gas discharge lamp 6.

With high-pressure gas discharge lamps, the re-ignition voltage is determined by the temperature of the electrodes 11 and 12. Hot electrodes emit more electrons than cold ones. Thus, the hotter the electrodes 11 and 12 during the re-ignition, the lower the necessary re-ignition voltage after the pole reversal.

In accordance with the invention, the high-pressure gas discharge lamp 6 is reproduced as a model in the control circuit 7, so as to determine the temperature of the electrodes 11 and 12 of the high-pressure gas discharge lamp 6. In this case, the model is configured such that it permits a sufficiently exact simulation of the instantaneously existing electrode temperature. It is advantageous, for example, if the desired model is effected with a delay element of the first order.

The control circuit 7 adjusts the length of the half waves by means of a function. This function depends on the determined instantaneous temperature of the electrodes 11 and 12 for the high-pressure gas discharge lamp 6 as well as on its lamp current $I_L$. It is advisable if the function is selected such that the temperature of the electrodes 11 and 12 for the high-pressure gas discharge lamp 6 is always constant just prior to the pole reversal. If the temperature of the electrodes 11 and 12 for the high-pressure gas discharge lamp 6 are cold, they are supplied longer with current in one direction than if they are hot.

One advantageous embodiment of the control circuit 7 is shown in FIG. 2 and provides that the control circuit 7 comprises a microcontroller 71, which is connected to the lamp model 73 and is used to generate the necessary control pulse sequences for the bridge circuit 3. The microcontroller is advisably connected to an ASIC 72, i.e., an application-specific integrated circuit. The application-specific adaptation to the respective control section can be effected simply in this way and can thus be made available to the control circuit 7.

With the aid of the invention, the half-wave times of the lamp supply voltage $U_L$ are advantageously and adaptively adjusted to the instantaneous temperature of the electrodes 11 and 12 for high-pressure gas discharge lamp 6. As a result of this, it is possible to keep the open-circuit voltage of the supply circuit low, thereby resulting in an improvement of the cost-effectiveness ratio.

I claim:

1. Circuit arrangement for starting and operating a high-pressure gas discharge lamp operating by controlled alternating current, in particular for use with motor vehicle headlamps, with the circuit arrangement comprising: a direct current/direct current converter for converting the voltage ($U_B$) of a direct voltage source to a higher value; a controlled full bridge circuit, which can be operated either with direct or alternating current, for generating a controlled alternating current ($I_L$) for supplying the high-pressure gas discharge lamp from the higher value voltage of the direct current/direct current converter; for actuating the full bridge circuit; and an ignition device for igniting the high-pressure gas discharge lamps; and wherein the control circuit controls the full bridge circuit such that the duration of the half-wave phases of the alternating current ($I_L$) that supplies the high-pressure gas discharge lamp is variable and is varied in dependence on the respective temperature of the electrodes of the high-pressure gas discharge lamp (6).

2. Circuit arrangement according to claim 1, wherein the duration of the half-wave phases during the start-up as well as during the operation of the high-pressure gas discharge lamp is variable.

3. Circuit arrangement according to claim 1, wherein in order to determine the temperature of the electrodes of the high-pressure gas discharge lamp, a model of the high-pressure gas discharge lamp is reproduced in the control circuit.

4. Circuit arrangement according to claim 3, wherein a first-order delay element is provided in the control circuit for reproducing an approximate model of the high-pressure gas discharge lamp.

5. Circuit arrangement according to claim 1 wherein the control circuit adjusts the length of the half waves with the aid of a function, which depends on the determined instantaneous temperature of the electrodes of the high-pressure gas discharge lamp as well as on the lamp current ($I_L$).

6. Circuit arrangement according to claim 5, wherein the function is selected such that the temperature of the electrodes for the high-pressure gas discharge lamp is always constant just prior to the pole reversal.

7. Circuit arrangement according claim 1, wherein the control circuit has a microcontroller, which generates the necessary control pulse sequences.

8. Circuit arrangement according to claim 7, wherein an ASIC is connected to the microcontroller to provide the application-specific adaptation to the respective control profile.

* * * * *